March 26, 1940. C. B. SCHAFER ET AL 2,194,570
APPARATUS FOR USE IN THE CUTTING OF PLASTIC SHEETING
Filed Feb. 1, 1937 2 Sheets-Sheet 1
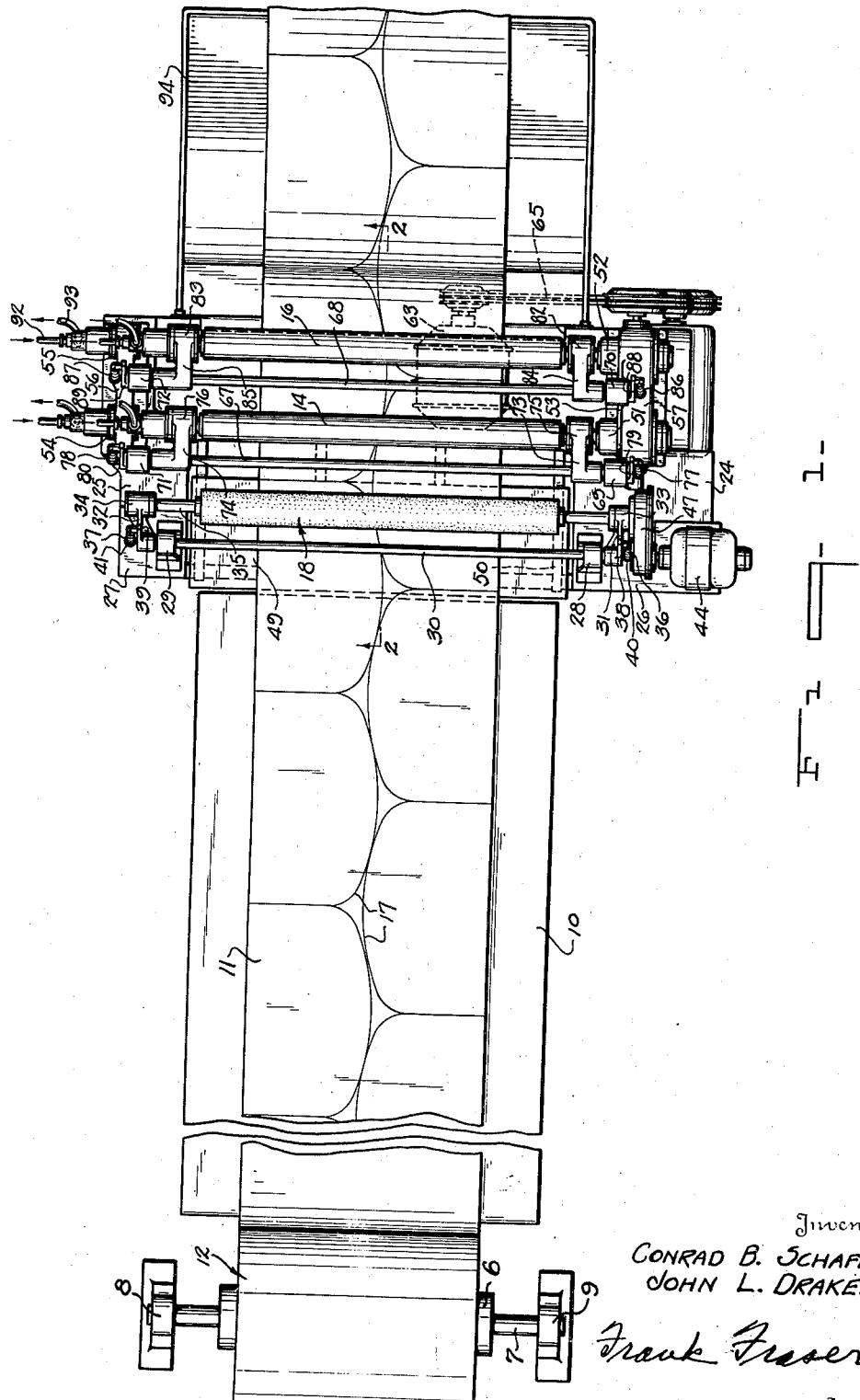
Inventors
CONRAD B. SCHAFER.
JOHN L. DRAKE.
Frank Fraser
Attorney March 26, 1940.     C. B. SCHAFER ET AL     2,194,570
APPARATUS FOR USE IN THE CUTTING OF PLASTIC SHEETING
Filed Feb. 1, 1937     2 Sheets-Sheet 2
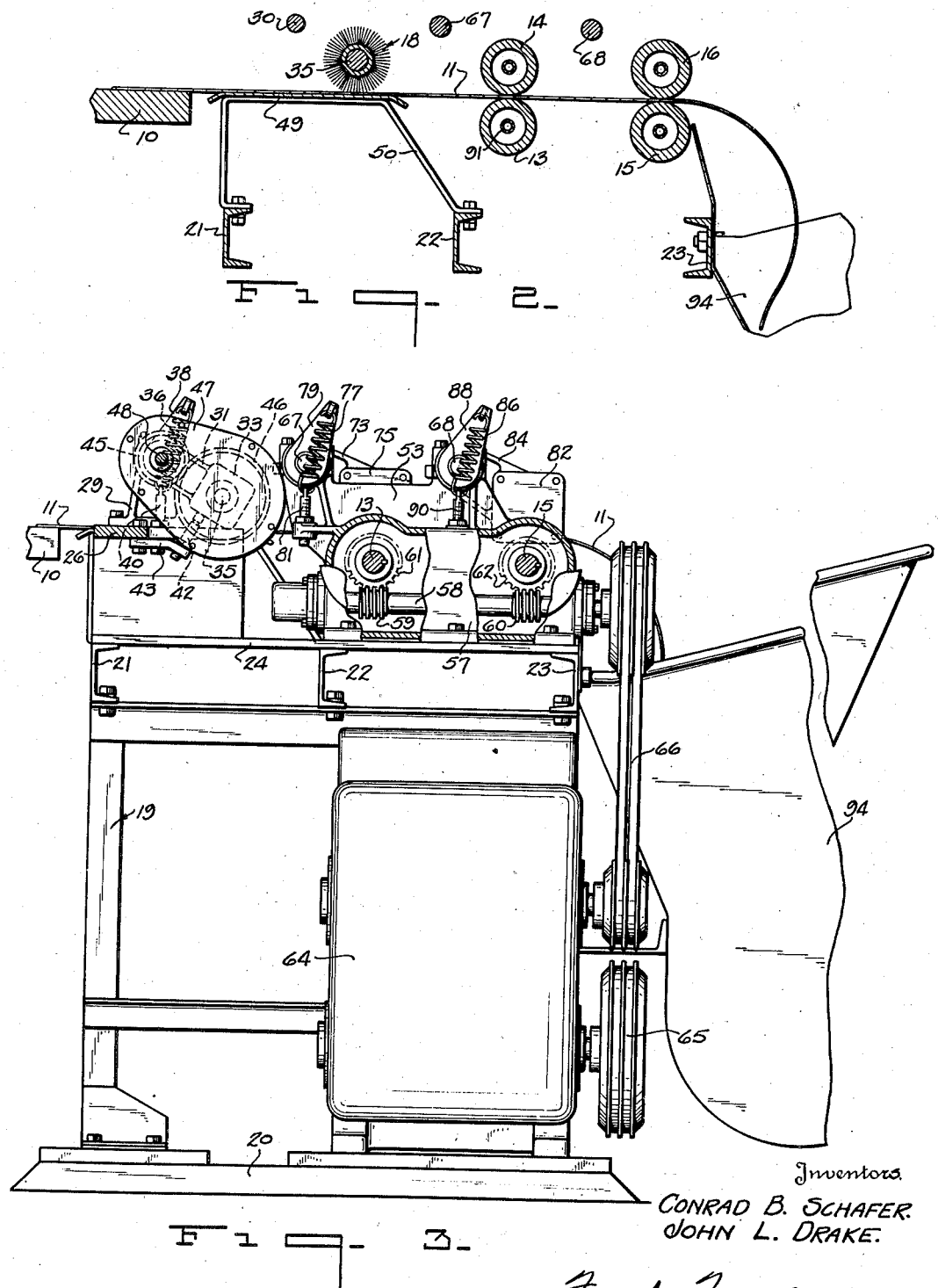
Inventors
CONRAD B. SCHAFER
JOHN L. DRAKE
By Frank Fraser
Attorney Patented Mar. 26, 1940

2,194,570

UNITED STATES PATENT OFFICE 2,194,570

APPARATUS FOR USE IN THE CUTTING OF PLASTIC SHEETING

Conrad B. Schafer and John L. Drake, Toledo, Ohio, assignors to Libbey-Owens-Ford Glass Company, Toledo, Ohio, a corporation of Ohio Application February 1, 1937, Serial No. 123,403

9 Claims. (Cl. 18—1)

The present invention relates broadly to the handling and treatment of plastic sheeting and more particularly to the cutting and flattening of sheet plastic which is used in the making of laminated safety glass.

In the manufacture of laminated safety glass comprising two sheets of glass and a sheet of transparent plastic material interposed therebetween and bonded thereto to provide a composite structure, the glass and plastic sheets are first cut to the desired size before being assembled and bonded together. The plastic sheeting is ordinarily received by the safety glass manufacturer in relatively large rolls upon which it is wound in the form of a continuous ribbon. The plastic is unwound from the roll as needed and sheets or sections of the desired shape and size cut therefrom. The cutting is usually accomplished by first scoring the plastic with a suitable scriber such as, for example, a sharp needle, after which the cut section or sheet is broken out by flexing the plastic. The scoring and breaking operations are performed manually and in scoring the plastic the operator usually employs a template or pattern of the desired contour which serves as a guide for the scriber.

The plastic, upon being unwound from the roll, does not ordinarily lie flat but has a tendency to bow or buckle as a result of its being wound on the roll and this tendency toward buckling not only renders the rapid and accurate cutting of the plastic more difficult but is also objectionable when handling the plastic and assembling it with the glass sheets. In addition to the "set" taken by the plastic upon the roll, the plastic as received by the safety glass manufacturer is not always smooth but in some cases may be slightly wrinkled.

An important object of this invention is the provision of apparatus for facilitating the rapid, accurate scoring of the plastic sheeting and wherein the said sheeting is slowly but continuously withdrawn from the roll and the scoring thereof by the operator accomplished as it is moving forwardly.

Another important object of the invention is the provision of apparatus of this character embodying means for effectively maintaining the plastic sheeting in a flattened condition during the scoring thereof.

A further important object of the invention is the provision of apparatus of this character embodying means for effecting the flattening and smoothing of the plastic sheeting, preferably after the scoring thereof, whereby to remove all wrinkles therefrom as well as eliminating all tendency of the plastic to resume the bowed or "set" condition which resulted from its being wound upon the roll.

Other objects and advantages of the invention will become more apparent during the course of the following description when taken in connection with the accompanying drawings.

In the drawings wherein like numerals are employed to designate like parts throughout the same, Fig. 1 is a plan view of apparatus constructed in accordance with the invention, Fig. 2 is a longitudinal sectional view taken substantially on line 2—2 of Fig. 1, and Fig. 3 is a side elevation of the plastic drawing and flattening means, partially broken away.

In the embodiment of the invention illustrated in the drawings, 10 designates the flat horizontal top of a stationary table or like support over and in contact with which the plastic sheeting 11 is drawn and upon which the said sheeting is adapted to be cut. The plastic sheeting is ordinarily received by the safety glass manufacturer in a relatively large roll and this roll is positioned at one end of the table 10 as indicated at 12, the plastic being withdrawn slowly but continuously from said roll and over said table by the two pairs of drawing rolls 13, 14 and 15, 16 arranged transversely of the table at the opposite end thereof. The supply of plastic sheeting may be supported in any desired manner but, as here shown, the roll 12 is carried by a drum 6 mounted upon a shaft 7 rotatably supported at its opposite ends in the supporting standards 8 and 9.

During the travel of the plastic over the table, sheets or sections of the desired shape and size are adapted to be cut therefrom by one or more operators, and after the plastic passes between the rolls 13, 14 and 15, 16, the scored sheets or sections may be completely broken out by simply flexing the plastic. The scoring is ordinarily achieved by placing a template or pattern of the desired contour upon the moving plastic and then drawing a scriber or the like around and in engagement with the edge of said template or pattern to effect the scoring of the plastic as indicated at 17 in Fig. 1.

After the plastic has been scored but before it passes between the rolls 13, 14, the upper surface thereof may be acted upon by a suitable rotary brush 18 which serves to remove the small loose particles of plastic resulting from the scoring operation.

The drawing rolls 13, 14 and 15, 16, together with the rotary brush 18, are carried by a supporting framework 19 mounted upon a base 20 and including the three horizontally spaced transverse channel beams 21, 22 and 23 upon which are supported at opposite sides of the table the horizontal supporting plates 24 and 25. Mounted upon the supporting plates 24 and 25 and spaced thereabove are the platforms 26 and 27 to which are secured the bearing brackets 28 and 29 respectively. Extending transversely of the table and journaled in the bearing brackets 28 and 29 is a rod 30 which pivotally carries the brush 18. To this end, there is fixed to the opposite ends of the rod 30, outwardly of bearing brackets 28 and 29, the bracket arms 31 and 32 provided at their outer ends with the bearing blocks 33 and 34 respectively in which is journaled the shaft 35 of brush 18.

The rotary brush 18 is maintained in yieldable engagement with the plastic by tension springs 36 and 37 which are attached at their upper ends to the substantially vertical lever arms 38 and 39 carried by the bracket arms 31 and 32 and at their lower ends to pins 40 and 41 carried by the platforms 26 and 27. The downward movement of the brush is limited by a stop bolt 42 positioned preferably at each end of the brush and adapted to be engaged by the respective bearing block 33 or 34. The bolt 42 may be adjustably carried by a bracket 43 secured to the respective platform 26 or 27.

As shown in Fig. 3, when the brush 18 is lowered to engage the plastic, the lever arms 38 and 39 are inclined to the vertical in the direction of the brush so that the action of the springs 36 and 37 tends to turn the rod 30 in a clockwise direction to urge the brush into yieldable engagement with the plastic. When it is desired to raise the brush out of contact with the plastic, it is simply necessary to swing the lever arms 38 and 39 to the left in Fig. 3 to bring the upper ends thereof at the other side of the axis of rotation of the rod 30. This will cause the rod to be turned in a counter-clockwise direction, thereby lifting the brush from the plastic, and the springs 36 and 37 will serve to maintain the brush in elevated position until the lever arms 38 and 39 are again swung to the right to the position shown in Fig. 3.

The brush 18 is adapted to be positively driven from a motor 44, mounted upon the platform 26, through the intermeshing gears 45 and 46 contained in the housing 47 and fixed respectively to the motor shaft 48 and brush shaft 35. The housing 47 is formed as a part of the bearing block 33 and is pivotally mounted on the motor shaft 48 so that the driving mechanism in no way interferes with vertical movement of the brush.

As the plastic sheeting passes beneath the brush 18, it is supported upon a horizontal plate 49 carried by a plurality of spaced brackets 50 secured to the transverse channel beams 21 and 22.

In accordance with the invention, the lower drawing rolls 13 and 15 are adapted to be positively driven while the upper rolls 14 and 16 are not. Also, the two rolls 15, 16 are adapted to rotate at a relatively greater peripheral speed than the rolls 13, 14 to place the plastic between the two sets of rolls under tension, and to this end the rolls 15, 16 are shown as being of a slightly larger diameter than the rolls 13, 14. However, the rolls 15, 16 may be of the same size as rolls 13, 14 and driven relatively faster.

The lower rolls 13 and 15 are rotatably supported at one end in the bearings 51 and 52 respectively carried by a bracket 53 mounted upon the horizontal supporting plate 24 and at the opposite end in bearings 54 and 55 carried by a bracket 56 mounted upon the horizontal supporting plate 25. Formed integral with or carried by the bracket 53 is a housing 57 and mounted in this housing is a horizontal shaft 58 to which are keyed the worms 59 and 60 meshing with worm gears 61 and 62 fixed to the adjacent ends of rolls 13 and 15 respectively. The shaft 58 is driven from a motor 63 through suitable reduction gearing contained in the casing 64 and belt and pulley connections 65 and 66.

The upper rolls 14 and 16 are pivotally carried by transverse rods 67 and 68 respectively in much the same manner that the brush 18 is carried by rod 30. The rods 67 and 68 are rotatably mounted at one end in bearings 69 and 70 respectively carried by bracket 53 and at their opposite end in bearings 71 and 72 respectively carried by bracket 56. Keyed to the rod 67, inwardly of bearings 69 and 71, are the bracket arms 73 and 74 formed at their outer ends with bearing blocks 75 and 76 respectively in which the opposite ends of the roll 14 are journaled. The roll 14 is also held in yieldable engagement with the plastic and this is accomplished by tension springs 77 and 78 secured at their upper ends to the lever arms 79 and 80 fixed to the opposite ends of the rod 67 and at their lower ends to bolts 81 carried by the brackets 53 and 56. The arrangement of the springs 77 and 78 and lever arms 79 and 80 is the same as the arrangement of the springs and lever arms employed for yieldably urging the brush 18 to engage the plastic and operate in the same manner.

The roll 16 is journaled at its opposite ends in bearing blocks 82 and 83 provided at the outer ends of bracket arms 84 and 85 respectively fixed to the rod 68 and is also yieldably held in engagement with the plastic by the tension springs 86 and 87 fastened at their upper ends to the lever arms 88 and 89 and at their lower ends to bolts 90. From the above, it will be seen that the rolls 14 and 16 can be raised and lowered in the same manner as brush 18.

Either but preferably both sets of rolls 13, 14 and 15, 16 are adapted to be heated such as by the continuous circulation of hot water therethrough. To this end there may be arranged within each roll a longitudinally extending pipe 91 provided with a plurality of perforations in the wall thereof. The hot water is introduced into the pipe at one end of the roll through an inlet connection 92 and, after discharging through the perforations in the pipe into the interior of the roll, flows therefrom through an outlet connection 93 at the end of said roll.

When cutting plastic sheeting with the apparatus described, the roll of plastic 12 is first positioned at one end of the table 10 as shown in Fig. 1 and the free end of the plastic sheeting drawn over the table and passed successively between the rolls 13, 14 and 15, 16. The rotation of the rolls will serve to draw the plastic continuously over and in contact with the table, with the tension or drag on the plastic being sufficient to cause it to lie flat thereon. One or more operators at either or both sides of the table are adapted to score the plastic as it moves forwardly and, as pointed out above, this is usually done by first laying a template or pattern upon the moving plastic and drawing a scriber around the edge thereof. After passing between the rolls 15, 16, the scored plastic is received in a receptacle 94 where the scored sheets or sections can be completely broken out by simply flexing the plastic.

The rolls 13, 14 and 15, 16 not only serve to draw the plastic continuously over the table 10 in a manner to facilitate rapid and accurate cutting of the plastic, but they also function as flattening rolls to iron out and smooth the plastic so that after it passes beyond the rolls, all wrinkles therein will be removed and in addition there will be no tendency for it to bow or resume the "set" condition it took upon the roll 12. As brought out above, the rolls 13, 14 and 15, 16 are not only heated but, in addition, the rolls 15, 16 rotate at a slightly greater peripheral speed than the rolls 13, 14, with the result that the length of plastic between the two pairs of rolls is maintained under tension. This tension, coupled with the heating of the plastic by the rolls, serves to effectively smooth and flatten the plastic. The plastic is caused to lie flat upon the table 10 during cutting by the drag or tension exerted thereon by the drawing rolls and is then flattened and smoothed as it passes between the rolls 13, 14 and 15, 16.

It will thus be seen that there has been provided novel apparatus for facilitating the rapid, accurate scoring of the plastic sheeting in a substantially continuous manner and for causing the plastic to lie flat during the scoring thereof. The apparatus provided also effects the smoothing and flattening of the plastic after scoring, thereby permitting the plastic sheets to be more easily handled and assembled with the glass sheets in the making of laminated safety glass. It is of course desirable that the small particles of plastic resulting from the scoring operation be removed before the plastic is subjected to the heated drawing rolls and this is effected by the rotary brush 18.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two pairs of superimposed rolls between which said sheeting is successively passed, means for driving the second pair of superimposed rolls at a relatively greater peripheral speed than the first pair of rolls, and means for heating said rolls.

2. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two horizontally spaced pairs of superimposed rolls between which said sheeting is successively passed, means for driving the second pair of rolls at a relatively greater peripheral speed than the first pair of rolls, means for heating said rolls, and a brush positioned in advance of the rolls acting upon the upper surface of the sheeting.

3. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two pairs of superimposed rolls between which said sheeting is successively passed, means for driving the second pair of superimposed rolls at a relatively greater peripheral speed than the first pair of rolls, and means for internally heating said rolls.

4. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two horizontally spaced pairs of superimposed rolls between which said sheeting is successively passed, means for driving the second pair of rolls at a relatively greater peripheral speed than the first pair of rolls, means for internally heating said rolls, and a rotary brush positioned in advance of the rolls acting upon the upper surface of the sheeting.

5. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two horizontally spaced pairs of superimposed rolls between which said sheeting is successively passed, means for positively driving the lower rolls, the upper rolls being idler rolls, and means for heating both the upper and lower rolls, means for driving the second pair of rolls at a relatively greater peripheral speed than the first pair of rolls to maintain the plastic sheeting between the two pairs of rolls under tension.

6. In apparatus of the character described for the cutting and flattening of plastic sheeting, a substantially flat horizontal cutting table over which the plastic sheeting is adapted to be continuously drawn and upon which it is adapted to be cut during movement thereof, means for drawing the plastic sheeting over said cutting table including two horizontally spaced pairs of superimposed rolls between which the sheeting is successively passed, means for internally heating said rolls, means for positively driving the lower rolls, means for pivotally supporting the upper rolls for vertical movement, and means for mounting said upper rolls for free rotation, means for driving the second pair of superimposed rolls at a relatively greater peripheral speed than the first pair of rolls to maintain the plastic sheeting between the two pairs of rolls under tension.

7. In the cutting and flattening of plastic sheeting, the method which comprises drawing the sheeting over and in contact with a flat horizontal supporting surface, scoring the sheeting as it travels over said surface, then passing the scored sheeting successively between two pairs of heated metallic surfaces, placing the sheeting under tension as it passes from one pair of heated metallic surfaces to the other, and in finally breaking the sheeting along the scored lines.

8. In the cutting and flattening of plastic sheeting, the method which comprises drawing the sheeting over and in contact with a flat horizontal supporting surface, scoring the sheeting as it travels over said surface, brushing the upper surface of the sheeting subsequent to scoring, then passing the scored sheeting successively between two pairs of heated metallic surfaces, placing the sheeting under tension as it passes from one pair of heated metallic surfaces to the other, and in finally breaking the sheeting along the scored lines.

9. In apparatus of the character described for the cutting and flattening of plastic sheeting, a substantially flat horizontal cutting table, means arranged at one end of said cutting table for supporting a supply of the plastic sheeting, means arranged at the opposite end of said cutting table for drawing the plastic sheeting over the said table including two pairs of superimposed rolls between which said sheeting is successively passed, and means for driving the second pair of superimposed rolls at a relatively greater peripheral speed than the first pair of rolls.

CONRAD B. SCHAFER.
JOHN L. DRAKE.